United States Patent
Gardien et al.

(10) Patent No.: US 12,265,185 B2
(45) Date of Patent: Apr. 1, 2025

(54) VARIABLE RESONANCE FREQUENCY ACOUSTIC WAVE EMISSION AND/OR DETECTION DEVICE

(71) Applicant: COMMISSARIAT A L'ENERGIE ATOMIQUE ET AUX ENERGIES ALTERNATIVES, Paris (FR)

(72) Inventors: François Gardien, Grenoble (FR); François Blard, Grenoble (FR); Bruno Fain, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/813,063

(22) Filed: Jul. 18, 2022

(65) Prior Publication Data

US 2023/0028853 A1  Jan. 26, 2023

(30) Foreign Application Priority Data

Jul. 19, 2021 (FR) .................................... 21 07781

(51) Int. Cl.
*G01S 7/521* (2006.01)
*B06B 1/06* (2006.01)
(Continued)

(52) U.S. Cl.
CPC ................ *G01S 7/521* (2013.01); *B06B 1/06* (2013.01); *G01S 7/524* (2013.01); *G01S 7/526* (2013.01); *G01S 15/89* (2013.01)

(58) Field of Classification Search
None
See application file for complete search history.

(56) References Cited

U.S. PATENT DOCUMENTS 3,798,590 A * 3/1974 Jacobson .............. G01S 15/586
367/90
4,207,625 A * 6/1980 Klund ..................... G01S 7/527
367/90
(Continued)

FOREIGN PATENT DOCUMENTS

CN 101294796 A * 10/2008
CN 101458332 A 6/2009
(Continued)

OTHER PUBLICATIONS

Design and development of an electronic interface circuit for piezoelectric sensors applied to impact detection. Gunther Monté Muñoz. Vittorio Ferrari. Feb. 25, 2011. (Year: 2011).*
(Continued)

*Primary Examiner* — Isam A Alsomiri
*Assistant Examiner* — Jonathan D Armstrong
(74) *Attorney, Agent, or Firm* — Oblon, McClelland, Maier & Neustadt, L.L.P.

(57) ABSTRACT

An acoustic, preferably ultrasonic, wave emission and/or reception device, including a wave emitter configured to transmit waves at an emission frequency, and a receiver of preferably ultrasonic waves, separate from the emitter, having a resonance frequency, and configured to receive waves generated by the emitter and including direct waves and reflected waves, wherein the device includes a resonance frequency modulator of the receiver and a control unit configured to control the resonance frequency modulator during a predetermined time period, so as to reduce the sensitivity of the receiver during the predetermined time period by moving the resonance frequency of the receiver away from the emission frequency of the emitter. The acoustic device relates to the field of ultrasonic sensors, particularly PMUTs or CMUTs, having a high quality factor.

12 Claims, 4 Drawing Sheets

(51) Int. Cl.
*G01S 7/524* (2006.01)
*G01S 7/526* (2006.01)
*G01S 15/89* (2006.01)

(56) References Cited

U.S. PATENT DOCUMENTS

| | | | | |
|---|---|---|---|---|
| 4,264,788 | A * | 4/1981 | Keidel | G01F 23/2968 |
| | | | | 367/908 |
| 4,282,589 | A * | 8/1981 | Evetts | G01S 15/582 |
| | | | | 367/90 |
| 6,571,144 | B1 * | 5/2003 | Moses | G11B 20/00086 |
| | | | | 704/E19.009 |
| 6,731,569 | B2 | 5/2004 | Yurchenko et al. | |
| 7,046,015 | B2 | 5/2006 | Suginouchi et al. | |
| 7,176,789 | B2 * | 2/2007 | Herder | G01S 15/931 |
| | | | | 342/134 |
| 7,591,788 | B2 * | 9/2009 | Phillips | G01S 7/52039 |
| | | | | 600/443 |
| 9,921,057 | B2 | 3/2018 | Zhou et al. | |
| 2005/0088334 | A1 * | 4/2005 | Herder | G01S 15/003 |
| | | | | 342/70 |
| 2006/0232165 | A1 * | 10/2006 | Amaike | G10K 9/122 |
| | | | | 310/322 |
| 2010/0245065 | A1 * | 9/2010 | Harada | G01S 15/003 |
| | | | | 340/435 |
| 2014/0331772 | A1 | 11/2014 | Klotz et al. | |
| 2017/0320093 | A1 * | 11/2017 | Chatterjee | B06B 1/0629 |
| 2019/0102046 | A1 * | 4/2019 | Miranto | B06B 1/0622 |
| 2020/0174116 | A1 | 6/2020 | Toda | |

FOREIGN PATENT DOCUMENTS

| | | | |
|---|---|---|---|
| EP | 3 102 964 B1 | 7/2020 | |
| FR | 3 077 161 A1 | 7/2019 | |
| JP | 2001108739 A * | 4/2001 | |
| WO | WO-2005106530 A1 * | 11/2005 | G01F 1/66 |
| WO | WO 2012/152493 A1 | 11/2012 | |

OTHER PUBLICATIONS

French Preliminary Search Report issued Mar. 25, 2022 in French Application 21 07781 filed on Jul. 19, 2021, citing documents AC-AD & AQ-AS therein, 9 pages (with English Translation of Categories of Cited Documents & Written Opinion).

Liu et al., "Reducing ring-down time of pMUTs with phase shift of driving waveform", Sensors and Actuators A: Physical, vol. 281, 2018, pp. 100-107.

Office Action issued Oct. 25, 2023, in corresponding European Patent Application No. 22 185 569.5, 4 pages.

* cited by examiner

VARIABLE RESONANCE FREQUENCY ACOUSTIC WAVE EMISSION AND/OR DETECTION DEVICE

TECHNICAL FIELD

The present invention relates to the field of ultrasonic sensors, particularly piezoelectric micromachined ultrasonic transducers of the PMUT type or capacitive micromachined ultrasonic transducers of the CMUT type, having a high quality factor, in particular between 10 and 100.

The present invention will have applications in detecting fingerprints, portable ultrasonic medical imaging, presence detection or also home automation and virtual reality.

STATE OF THE ART

Proximity sensors such as ultrasonic sensors have been widely used for detecting the distances to objects. In particular, ultrasonic sensors are generally configured to generate ultrasonic signals with an ultrasonic transducer and to receive echo signals reflected by the objects. By calculating the time interval between the sending of the ultrasonic signal and the reception of the echo signal, the distance to an object can be determined based on the propagation speed of the sound through the propagation medium, such as air.

Traditionally, the application of ultrasonic sensors is limited by the existence of a blind zone, which is caused by interfering mechanical vibrations of the ultrasonic transducer. Ultrasonic transducers are generally configured to generate ultrasonic signals when they are actuated by an excitation signal. For example, an electrical energy pulse can make a piezoelectric transducer vibrate at a given frequency due to the piezoelectricity, thus generating an ultrasonic wave. The ultrasonic signal transmitted is reflected by an object, the echo of the ultrasonic signal can thus be detected and evaluated to determine a distance to the object. The response of the ultrasonic transducer comprises the measurement of the echo, which is the signal of interest, and undesired interfering mechanical vibrations. If the interfering mechanical vibrations are too high, it is not possible to identify the signal of interest, and therefore to take the time of flight measurement. The amplitude of the interfering mechanical vibrations is significant just after the emission of the ultrasonic signal, then decreases over time, even though this problem appears in particular when the echo signal is expected for short times. Thus, for objects located at a low distance, the signal of interest cannot be correctly measured. The blind zone is a spatial zone surrounding the ultrasonic transducer, wherein the echo signals cannot be reliably detected.

The current methods attempt to resolve the problem of the blind zone by using, for example, by a software approach, wherein there is a un post-processing of the signal. However, the software approach simply avoids the taking into consideration, by the sensor, of the signals measured at the short times, and thus the detection, potentially erroneous, of an object at a low distance, to best identify the echo signals corresponding to a greater distance. This does not reduce nor remove the interfering vibrations of the transducer, the blind zone is therefore still present. In other words, the objects located in the blind zone cannot still be reliably detected.

Other methods use an electronic post-processing approach like document U.S. Pat. No. 9,921,057 which describes a system comprising an attenuator module electrically coupled with the ultrasonic receiver. The signal received for a given time corresponding to the blind zone is attenuated. This system does not enable either to reduce the blind zone, but only to better detect the objects outside of the blind zone.

Document CN 101 294 796 is also known, which describes a supersonic detector of the reflection type with a small blind zone based on multifrequency. Here, the document proposes to use two frequencies which are emitted, detected and analyzed according to the types of short or long measurements desired. This does not reduce or eliminate interfering receiver vibrations, so the blind zone is still present.

There is therefore a need to propose a transducer system which enables to optimise the detection of objects in the blind zone.

The other aims, characteristics and advantages of the present invention will appear upon examining the following description and the accompanying drawings. It is understood that other advantages can be incorporated.

SUMMARY

To achieve this aim, according to an embodiment, an acoustic, preferably ultrasonic wave emission and/or reception device is provided, comprising:
  a wave emitter configured to transmit waves at an emission frequency and
  a preferably ultrasonic wave receiver, preferably separate from the emitter having a resonance frequency and configured to receive waves generated by the emitter and comprising direct waves and reflected waves, characterised in that the device comprises
  a resonance frequency modulator of the receiver and
  a control unit configured to control the resonance frequency modulator during a predetermined time period so as to reduce the sensitivity of the receiver during said predetermined time period by moving the resonance frequency of the receiver away from the emission frequency of the emitter.

The invention proposes a device configured to modulate the resonance frequency of the receiver such that it is less sensitive. Thus, the sensitivity of the receiver is voluntarily degraded for a predefined time period, such that the receiver is less sensitive to the direct wave and therefore that it resonates in a less pronounced manner, thus enabling a reduction of the blind zone, and therefore measurements at shorter distances. The amplitude of the oscillations is reduced at the reception of the direct wave. Advantageously, the resonance frequency modulator is configured to move the resonance frequencies from the emitter and from the receiver, preferably at least the time of the reception of the direct wave, in order to reduce the blind zone.

The invention allows to modulate the resonance frequency of the receiver unlike known documents which retain the same resonance frequency.

Another aspect relates to a method for detecting acoustic waves by the acoustic wave emission and reception device, such as described above comprising the steps below:
  Emission of acoustic waves by the emitter at an emission frequency of the emitter,
  Modulation of the resonance frequency of the receiver for a predetermined time period, to move it away from the emission frequency of the emitter, then
  Detection of a wave reflected by the receiver.

BRIEF DESCRIPTION OF THE FIGURES

The aims, objectives, as well as the characteristics and advantages of the invention will best emerge from the detailed description of an embodiment of the latter, which is illustrated by the following accompanying drawings, wherein.

Figure 1:
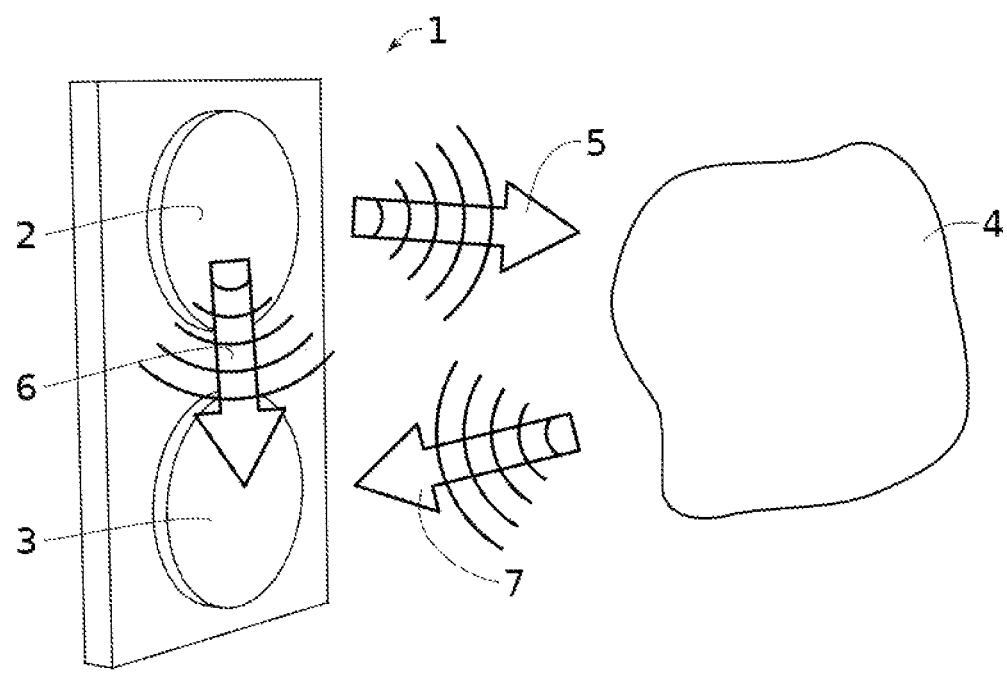
FIG. 1 represents a diagram of an ultrasonic emission and detection system.

The drawings are given as examples and are not limiting of the invention. They constitute principle schematic representations intended to facilitate the understanding of the invention and are not necessarily to the scale of practical applications.

DETAILED DESCRIPTION

Before starting a detailed review of embodiments of the invention, are stated below of the optional characteristics which can possibly be used in association or alternatively:

According to an example, the predetermined time period is at least equal to a time period for receiving the direct wave 6 by the receiver 3. The invention enables to shift the resonance frequency of the receiver at least during the reception of the direct wave, then advantageously to return it to the frequency of the emission once the direct wave has passed.

According to an example, the emission frequency of the emitter 2 is the resonance frequency of the emitter 2.

According to an example, the emission frequency of the emitter 2 is fixed.

According to an example, the emitter 2 and/or the receiver 3 is a PMUT-type piezoelectric micromachined transducer.

According to an example, the resonance frequency modulator of the receiver 3 is configured to make the polarisation of the receiver 3 vary during the predetermined time period.

According to an example, the emitter 2 and/or the receiver 3 is a CMUT-type capacitive micromachined transducer.

According to an example, the resonance frequency modulator of the receiver 3 is configured to vary the electrostatic rigidity of the receiver during the predetermined time period.

According to an example, the resonance frequency modulator of the receiver 3 comprises a negative counterreaction charge amplifier 11 configured to integrate the charge generated by the receiver 3 to apply a predefined polarisation voltage to the receiver.

Advantageously, the device is adapted to emit and/or receive acoustic waves of frequency of between 100 Hz and 75 MHz, preferably between 1 kHz and 10 MHz, preferably around 100 kHz.

According to an example, the predetermined time period starts at the same time as the acoustic wave emission starts.

This synchronisation of the emission of acoustic waves and of the modulation of the resonance frequency of the receiver enables to simplify the modulation of the resonance frequency of the receiver and to ensure an optimum effectiveness. According to a possibility, the predetermined time period starts before the start of the emission of acoustic waves. According to another possibility, the predetermined time period starts at the end of the emission of acoustic waves.

According to an example, the method comprises, after the emission of waves, the reception of a direct wave 6 by the receiver 3.

According to an example, the modulation of the resonance frequency of the receiver 3 starts during the reception of the direct wave 6 by the receiver 3.

According to an example, the modulation of the resonance frequency of the receiver 3 is simultaneous to the reception of a direct wave 6 by the receiver 3.

Advantageously, the modulation of the resonance frequency of the receiver is done only until the end of the reception of the direct wave.

According to an example, the modulation of the resonance frequency of the receiver 3 is done by a variation of the polarisation of the receiver 3 or a variation of the electrostatic rigidity of the receiver 3.

In the following description, when reference is made to absolute position qualifiers, such as the terms "front", "rear", "top", "bottom", "left", "right", or relative, such as the terms "above", "below", "upper", "lower", or orientation qualifiers, such as the terms "horizontal", "vertical", "vertically aligned with", reference is made to the orientation of the figures, being understood that, in practice, the devices described can be oriented differently.

Unless otherwise specified, the expressions "approximately", "substantially" and "around" mean almost 10%, preferably almost 5%.

The device according to the invention is intended for the emission and/or the reception of an acoustic wave. The device is, for example, a piezoelectric or capacitive transducer adapted to emit and/or receive sonic or ultrasonic acoustic waves, for example acoustic waves at frequencies of between 100 Hz and 75 MHz and preferably 1 kHz and 10 MHz. Below in the description, the terms "acoustic" or "ultrasonic" are interchangeable.

The device advantageously comprises an emitter 2 of acoustic waves which could be ultrasonic waves.

The device advantageously comprises a receiver 3 of acoustic waves which could be ultrasonic waves.

Preferably, according to the invention, the emitter 2 is separate from the receiver 3. The emitter 2 and the receiver 3 can be of strictly identical technology.

The receiver 3 receives ultrasonic waves generated by the emitter 2 and comprising direct waves 6 and reflected waves 7. By direct waves 6, this means waves generated by the emitter 2 and which reach the receiver 3 without being reflected, for example by being propagated in the surrounding environment, which can be air or liquid, or via a solid physical medium, like for example the medium of the device 1. By reflected waves 7, this means waves generated by the emitter 2 and which reach the receiver 3 after having met a surface of a solid obstacle, in particular the surface of an object located on the path of the waves emitted 5 by the emitter 2; the receiver 3 therefore both receives the direct waves 6 and the reflected waves 7. The measurement of the reflected wave can be used to evaluate the distance separating the object 4 and the device 1.

In certain cases, the receiver 3 and the emitter 2 are implemented in one same device. In other cases, the receiver 3 and the emitter 2 are implemented in separate devices. The device according to the invention can be unitary, for example, i.e. that it forms an assembly. The device according to the invention is movable. Preferably, the emitter 2 and the receiver 3 are immobile relative to one another. According to an embodiment, the emitter 2 and the receiver 3 are arranged on a front of the device 1 such that the emitter 2 emits to the outside of the device 1 and that the receiver receives waves from the outside of the device 1.

According to a preferred example, the emitter 2 and the receiver 3 are each a piezoelectric acoustic transducer which conventionally comprises a flexible membrane suspended by its periphery to a rigid support. The membrane comprises a piezoelectric conversion element constituted of a piezoelectric layer disposed between two electrodes. When a voltage is applied between the two electrodes, an electric field appears in the piezoelectric layer, causing a mechanical deformation of the piezoelectric layer and consequently a deformation of the membrane. Conversely, the application of a mechanical deformation to the membrane and therefore to the piezoelectric layer leads to a variation of the electric field and therefore an accumulation of charge in the two electrodes of the piezoelectric conversion element. Conventionally, a piezoelectric acoustic transducer comprises a circuit configured to, when emitting, apply an alternating excitation voltage between the two electrodes of the piezoelectric conversion element. This causes a mechanical vibration of the membrane leading to the emission of an acoustic wave. When receiving, the circuit is configured to read, between the two electrodes of the piezoelectric conversion element, an electric signal, for example an alternating voltage or an alternating current, representative of the variation of charges, in the electrodes, resulting from a vibration of the membrane caused by a received acoustic wave. The piezoelectric acoustic transducer is also called piezoelectric micromachined transducer, or PMUT.

According to another possible example, the emitter 2 and the receiver 3 are each a capacitive acoustic transducer which comprises a flexible membrane, also called mobile electrode, a rear cavity and a rear plate, also called lower electrode. In emission mode, an alternating voltage is applied to the terminals of the transducer of the cell thus creating an electrostatic force which will lead to a movement of the membrane. This movement will itself cause a radiated acoustic pressure in the front face of the membrane. In reception mode, it is the pressure of the acoustic wave applied on the membrane which causes its movement. This movement thus leads to a variation of the intrinsic capacity of the device. The capacitive acoustic transducer is also called capacitive micromachined transducer, or CMUT.

The device according to the invention in particular enables to measure the distance between the device and an object, by measuring the propagation time of the ultrasonic wave. The emitter 2 is configured to emit an acoustic wave 5 and the receiver 3 is configured to receive the wave reflected 7 by the object 4.

The receiver 3 being conventionally closer to the emitter 2 than the object 4 is close to the emitter 2, the receiver 3 commonly receives a direct acoustic wave 6. This direct acoustic wave 6 excites the receiver 3 sooner than the reflected wave 7, the travel time of the reflected wave 7 being greater than that of the direct wave 6. This excitation of the receiver 3 by the direct wave 6 leads to a residual vibration of the receiver 3, more specifically of the flexible membrane of the receiver 3, also called pseudo-oscillations 8. The reception of the direct wave 6 and/or the pseudo-oscillations 8 are interfering signals which interfere with the reception of the reflected wave 7. In particular, the time period during which the receiver 3 is excited by the direct wave 6 and the pseudo-oscillations 8 define a period or zone called blind zone 9. This zone 9 is a volume surrounding the receiver 3 defined by a component of a length which is at least equal to half of the distance separating it from the emitter 2, commonly this volume is greater, due to the pseudo-oscillations 8 which last at the receiver 3. This blind zone 9 corresponds to a time period during which the excitation of the receiver 3 is due to the direct wave 6. The time period corresponding to the blind zone 9 corresponds to the time period during which the receiver 3 receives the direct wave 6 and the pseudo-oscillations 8. This disadvantage is all the more greater that the detection and/or emission device has a high quality factor, in particular when to improve the sensitivity of the device, the emission frequency of the emitter is at the resonance frequency of the receiver. In a non-limiting manner, by high quality factor, this means a quality factor greater than 10, more preferably 50.

The emitter 2 emits acoustic waves at an emission frequency, while the receiver 3 has a resonance frequency. The sensitivity of the receiver is optimal when the emission frequency is equal to the resonance frequency of the receiver. Preferably, the emission frequency corresponds to the resonance frequency of the emitter 2. Preferably, the emission frequency is fixed. By that, this means that the emission frequency is not modulated by the present invention.

According to the invention, the emission and/or detection device 1 advantageously comprises a resonance frequency modulator of the receiver 3. The invention relates to the modification of the mechanical properties of the receiver 3 to enable to reduce the blind zone 9.

The resonance frequency modulator of the receiver 3 is configured to alternatively take a first modulation configuration, advantageously wherein the resonance frequency of the receiver is closest to the emission frequency of the emitter, and at least one second modulation configuration wherein the resonance frequency of the receiver is further away from the emission frequency of the emitter 2 than in the first configuration. By further away, this means when the resonance frequency of the receiver is further away by at least 1/Q %, Q being the quality factor, preferably by at least 2/Q %. The first configuration is advantageously a default configuration, wherein the resonance frequency of the receiver 3 is not modulated. According to this first default configuration, the resonance frequency of the receiver 3 is advantageously quite close to the emission frequency. According to a possibility, the first configuration can be a configuration, wherein the resonance frequency of the receiver 3 is modulated to be closest to the emission frequency and thus optimise the sensitivity of the receiver 3. The second configuration is advantageously a configuration wherein the resonance frequency of the receiver 3 is voluntarily modulated, preferably far away from the emission frequency of the emitter 2. The operation of the receiver is voluntarily modified. In the second configuration, the difference between the resonance frequency of the receiver 3 and the emission frequency of the emitter is greater than in the first configuration.

According to a preferred embodiment, the device comprises a unit for controlling the resonance frequency modulator. The control unit is advantageously configured to activate the resonance frequency modulator at least during a predetermined time period. This modification of the resonance frequency is advantageously intended to reduce the sensitivity of the receiver 3 during said predetermined time period. Thus, preferably, the modulation or modification of the resonance frequency of the receiver during the predetermined time period is a shift of the resonance frequency of the receiver 3 with respect to the emission frequency of the emitter 2.

Advantageously, the unit for controlling the modulator is configured to activate the first modulation configuration and alternatively at least the second modulation configuration of the resonance frequency modulator of the receiver 3.

Preferably, the resonance frequency modulator is configured such that the second modulation configuration moves the resonance frequency of the receiver 3 away from the emission frequency of the emitter 2 during the predetermined time period.

According to a possibility, the unit for controlling the frequency modulator of the receiver 3 is also configured to activate the resonance frequency modulator outside of the predetermined time period. In this case, outside of the predetermined time period, the resonance frequency modulator advantageously takes the first modulation configuration, which could advantageously be intended to tune the resonance frequency of the receiver 3 to the emission frequency of the emitter 2.

The resonance frequency is intended as an optimum of sensitivity.

The predetermined time period is advantageously a time period, less than or equal to the blind zone 9.

Advantageously, the end of the predetermined time period is earlier than or equal to the end of the blind zone 9, i.e. the end of the pseudo-oscillations 8.

Advantageously, the start of the predetermined time period is earlier than the start of the emission, or equal to the start of the emission or later than the start of the emission, i.e. more specifically, during the emission of the acoustic wave by the emitter 2.

According to the embodiment of the invention, wherein the receiver 3 and the emitter 2 are separate, it is advantageous that the start of the predetermined time period corresponds to the start of the emission of the acoustic wave by the emitter 2. By this synchronisation, the receiver 3 has its sensitivity degraded before starting to receive the direct wave 6, which will limit its excitation and therefore the amplitude of the pseudo-oscillations 8 and therefore the duration of the blind zone 9.

According to an alternative, the start of the predetermined time period corresponds to the start of the reception of the direct wave 6 by the receiver 3. In the same way as for the embodiment described above, with the sensitivity of the receiver 3 being degraded, the reception of the direct wave 6 is limited, reducing the pseudo-oscillations 8 and therefore the blind zone 9.

Figure 2:
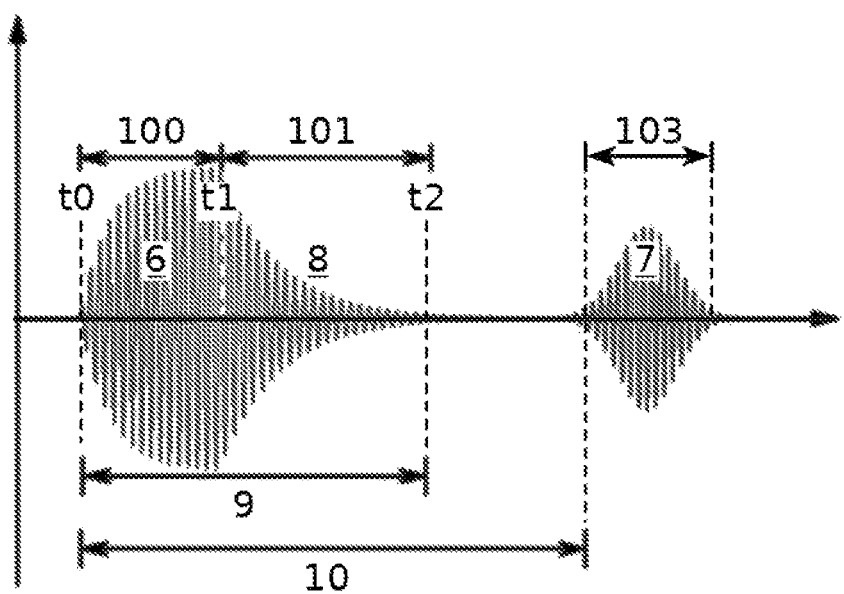
FIG. 2 represents a graph of the oscillations of the receiver in the absence of the invention.

In FIG. 2, a graph of signals detected by a receiver 3 according to the state of the art is given.

A first time period 100 corresponding to the reception of the direct wave 6 by the receiver 3 is observed in this figure. The start t0 of this first time period 100 corresponds to the start of the reception of the direct wave 6. According to an embodiment, wherein the emitter 2 is very close to the receiver 3, it can be considered that the start t0 of this first time period 100 also corresponds to the start of the emission of waves by the emitter 2. As an example, the distance between the emitter 2 and the receiver 3 is around a few millimetres, more specifically less than 10 mm. As an example, in air, 1 mm is travelled in around 3 μs. If the emitter 2 and the receiver 3 are close, the receiver 3 receives the direct wave 6 almost instantaneously. As an example, the path of the reflected wave is around 10 cm, more specifically less than 20 cm, in air, 10 cm is travelled in 300 μs. As an example, the order of magnitude of the duration of the emission (t1–t0) is 100 μs. The end t1 of this first time period 100 corresponds to the end of the reception of the direct wave 6. According to the embodiment, wherein the emitter 2 is very close to the receiver 3, it can be considered that the end t1 of this first time period 100 also corresponds to the end of the emission of waves by the emitter 2. Following this first time period 100, a second time period 101 corresponding to the residual oscillation of the receiver 3 or pseudo-oscillation 8 starts. This second time period 101 starts at the end of the first time period 100, i.e. at t1. This second time period 101 ends at t2, which corresponds to the moment when the pseudo-oscillations 8 no longer cause any reception signal from the receiver 3 which could prevent the identification of the echo signal. The third time period 103 corresponds to the reception of the reflected wave 7. The blind zone 9 corresponds to the sum of the first time period 100 and to the second time period 101. Advantageously, the predetermined time period corresponds at least to the first time period 100. Advantageously, the predetermined time period is less than or equal to the sum of the first time period 100 and the second time period 101. According to a considerable possibility, the predetermined time period is less than the first time period 100. In this case, the receiver 3 is not very sensitive to the direct wave 6; then becomes sensitive. However, the receiver 3 does not have the time to reach a regime of high amplitude, as the excitation signal stops rapidly. The residual oscillations are also of low amplitudes. The blind zone 9 would thus, all the same, be reduced. Preferably, the predetermined time period is greater than half of the first time period 100.

According to an embodiment of the invention, the resonance frequency modulator of the receiver 3 is configured to polarise the receiver 3 or modify the electrostatic rigidity of the receiver 3.

According to an example, the polarisation of the receiver 3 is achieved by the application of a polarisation voltage on the receiver 3. Thus, the control unit controls the modulator, such that it applies a polarisation voltage on the receiver 3, thus enabling to modulate the resonance frequency of said receiver 3. The polarisation of the receiver 3 is applied particularly for the emission and/or reception device according to the invention, which are of the PMUT-type piezoelectric transducer type.

According to an example, the modification of the electrostatic rigidity of the receiver 3 is achieved by the application of a voltage on the receiver 3. Thus, the control unit controls the modulator such that it applies a voltage on the receiver 3 thus enabling to modulate the resonance frequency of said receiver 3. The modification of the electrostatic rigidity is applied particularly for the emission and/or reception devices according to the invention which are of the capacitive transducer type, commonly called CMUT (capacitive micromachined ultrasonic transducer).

Figure 3:
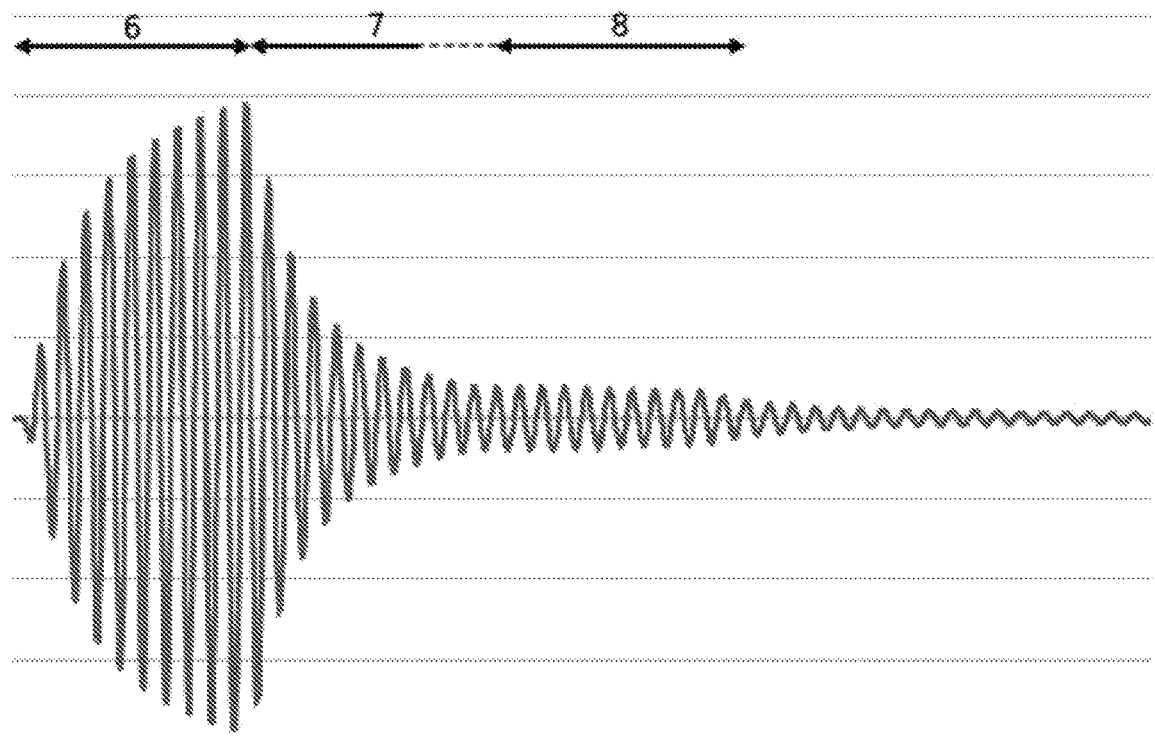
FIG. 3 represents a graph of the oscillations of the receiver in the absence of the invention.

In FIG. 3, the oscillations of the membrane of the receiver 3 of the state of the art are represented. The reception of the direct wave 6 then the pseudo-oscillations 8 and the reception of the reflected wave 7 are observed in this figure over time. It is seen in this figure that the reception of the reflected wave 7 is interfered with by the pseudo-oscillations 8 following the reception of the direct wave 6. Thus, the object 4 is too close, the reflected wave 7 arrives too early and the associated signal is hidden in the pseudo-oscillations 8.

Figure 4:
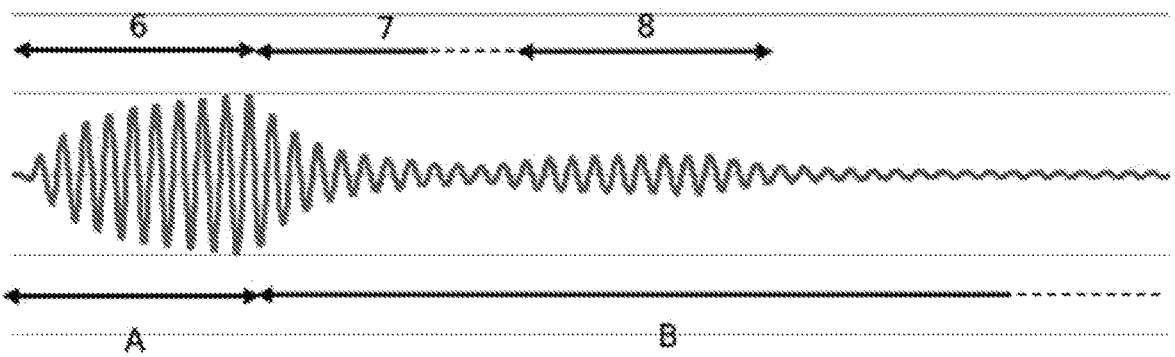
FIG. 4 represents a graph of the oscillations of the receiver with the system according to the invention.

In FIG. 4, the oscillations of the membrane of the receiver 3 according to the invention are represented. It is observed that the reception of the direct wave 6 is of a lower amplitude, since the pseudo-oscillations 8 are also of lower amplitudes. After a quite short duration, less than the duration 101, the echo signal is no longer hidden by the pseudo-oscillations. In this FIG. 4, the time period A corresponds to the predetermined time period, i.e. the period during which the resonance frequency of the receiver 3 is modulated to move away from the emission frequency of the emitter 2, and is chosen equal to the period 100. The time period B corresponds to a time period during which the resonance frequency of the receiver 3 is no longer modulated to move away from the resonance frequency of the emitter 2, which is modulated to reposition itself on the emission frequency of the emitter 2.

Figure 5:
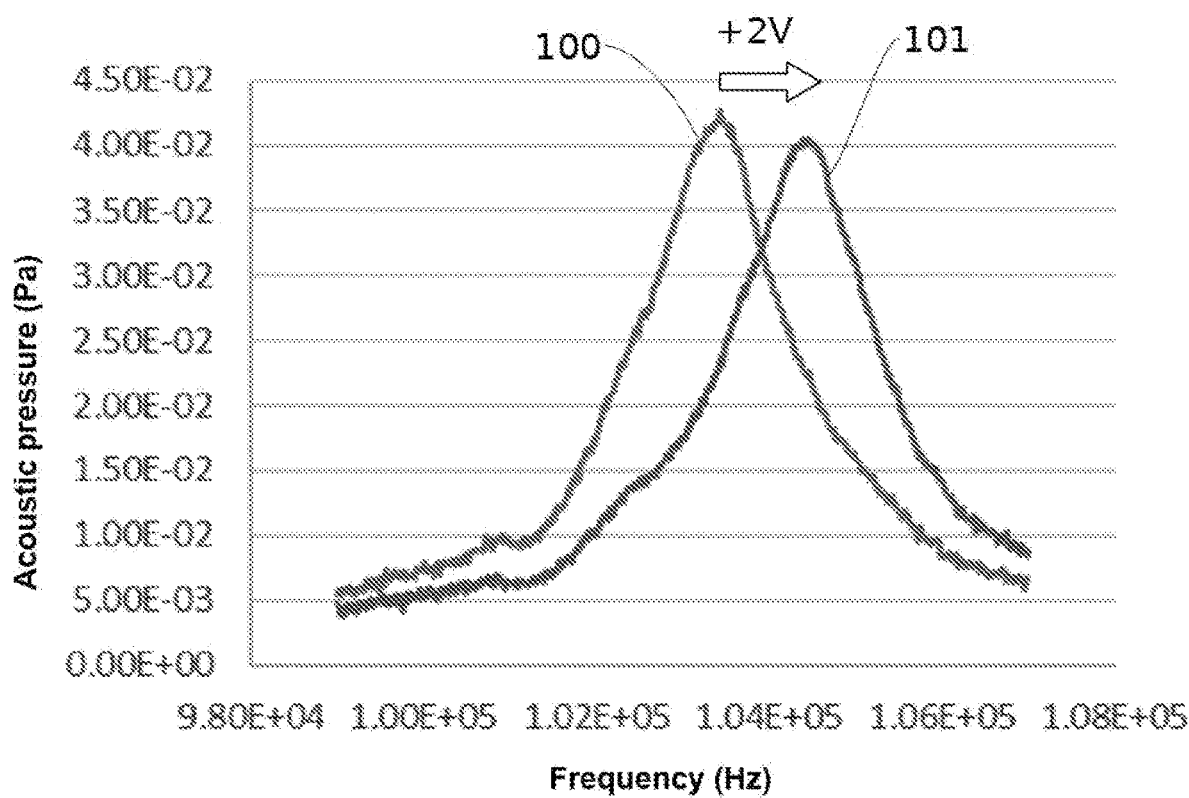
FIG. 5 represents a graph of the reception frequency of the receiver with the system according to the invention.

FIG. 5 illustrates the resonance frequency of a receiver 3. This figure illustrates the shift of the resonance frequency of the receiver 3 when a direct voltage of 2V is applied according to the diagram of FIG. 6.

Measurements are taken to quantify the shift of the resonance frequencies according to the polarisation voltages Vdc.

Thus, a PMUT membrane having a resonance frequency of 102 kHz has this frequency offset by 900 Hz with a polarisation of 2V.

If PMUTs are considered with a quality factor of 50, and a resonance frequency at 100 kHz, thus by emitting at 100 kHz, and by shifting by 1 kHz of the resonance frequency of the receiver, i.e. at 101 kHz, by applying a polarisation of 2V, at least during the duration of the emission, the sensitivity of the receiver 3 to the direct wave 6 is reduced by a root factor of 2, i.e. of around 1.4142.

According to an embodiment of the invention, it is possible to apply voltages which could go up to 20V.

According to an aspect of the invention, the resonance frequency modulator of the receiver 3 comprises a counter-reaction operational amplifier 11 for each electrode E1, E2, E3, E4. The operational amplifier 11 comprises a charge amplifier 14, a resistance 15 and a capacity 16. The polarisation of the PMUT-type receiver 3 is done via the counterreaction of the operational amplifier 11, also called charge operator. This use is counterintuitive: usually, it is preferable that operators 11 interfere as little as possible with the components placed upstream. The operational amplifier 11 therefore has two functions: integrating the charges generated by the PMUT-type receiver 3 and forcing the voltage on the second pin 12 at the same level as the third pin 13. The desired polarisation voltage at the terminals of the PMUT-type receiver 3 is applied to the third pin 13 of the operational amplifier 11.

Figure 6:
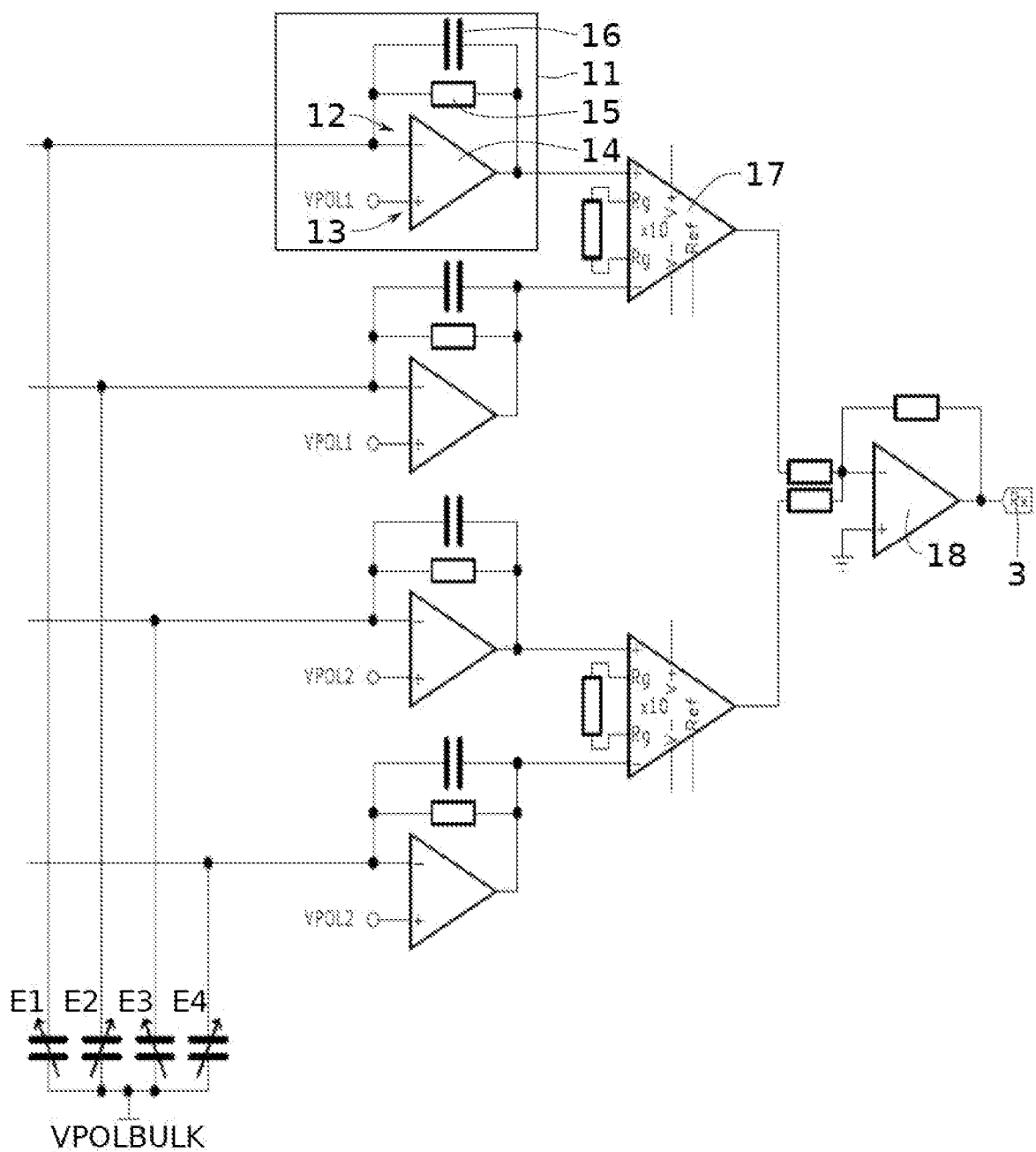
FIG. 6 represents an electric diagram of an ultrasonic detection system according to an embodiment of the invention.

FIG. 6 illustrates a receiver 3 according to this aspect of the invention.

The receiver 3 comprises at least one pair of electrodes E1/E2.

The electronic diagram is given for a PMUT comprising 2 pairs of electrodes (E1/E2-E3/E4), that is 4 electrodes E1, E2, E3, E4. This diagram can be stated with n (n being a natural integer) electrode pairs "En/En+1", polarised at n voltages "VPOLn", with charges generated opposite phases from one electrode to the other.

Each electrode E1, E2, E3, E4 is connected to the inverting input of a dedicated charge amplifier (for example, E1 is connected to the pin 12 of the charge amplifier 14). The two charge amplifiers 14 of two electrodes of one same pair are connected to one single instrumentation amplifier 17 located downstream from the two charge amplifiers. The two instrumentation amplifiers 17 are connected to an amplifier 18, which delivers the output signal.

The electronic diagram illustrated in FIG. 6 enables to polarise pairs of electrodes E1/E2 and E3/E4 with a specific polarisation voltage VPOL1 or VPOL2 for each pair of electrodes to modify the resonance frequency, while amplifying the charges generated opposite the phase within one same pair of electrodes, contrary to what is usually done.

The non-inverting output of the amplifiers is generally grounded and the sensors are polarised via one single voltage VPOLBULK.

Advantageously, the charge amplifier 14 has two roles: in one direction, it amplifies the charges, by integrating them in the capacity 16. The resistance 15 and the capacity 16 thus form a high-pass filter. In the other direction, the charge amplifier 14 imposes a voltage VPOL1 to E1 through the resistance 15. The resistance 15 and the capacity 16 thus form a low-pass filter.

The use of one same amplifier for 2 functions: one of reading, and another of polarisation is unusual. According to this aspect, it is also surprising to use an amplifier 14 input pin 12 to polarise, rather than the output pin 13.

As an example, according to FIG. 6, VPOLBULK is grounded, $$Vpol1 = -(Vpol2) = 2\ v,$$

$$15 = 10\ MOhms,$$

$$16 = 1\ pF,$$

the charge amplifiers and the instrumentation amplifiers are of the "JFET" (Junction Field Effect Transistor) type, to have a very high input impedance.

According to an aspect, the invention relates to a method for modulating the resonance frequency of a PMUT- or CMUT-type receiver 3, in particular. The method advantageously comprises, the application of a polarisation voltage VPOLn to a pair of electrodes and simultaneously, the amplification of charges generated opposite the phase within one same pair of electrodes. PMUTs and CMUTs emit ultrasounds in air, up to 5 to 10 metres. They are also very efficient in emission/reception in a liquid environment. The device of the invention thus aims for very varied applications in the medical, general public or automotive field. Micromachined transducers have dimensions, typically of around 10 to 1000 microns and are generally assembled in a large number.

The invention is not limited to the embodiments described above, and extends to all the embodiments covered by the invention.

LIST OF REFERENCES

1. Transducer
2. Emitter
3. Receiver
4. Object
5. Emitted wave
6. Direct wave
7. Reflected wave
8. Pseudo-oscillations
9. Blind zone
10. Travel time
11. Operational amplifier
12. Second pin
13. Third pin
14. Charge amplifier
15. Resistance
16. Capacity
17. Instrumentation amplifier
18. Amplifier
A. Modulation of the resonance frequency of the receiver
B. Repositioning of the resonance frequency of the receiver C. Resonance frequency of the receiver corresponding to the emission frequency of the emitter
E1. Electrode
E2. Electrode
E3. Electrode
E4. Electrode
101. First time period
102. Second time period
103. Third time period

The invention claimed is:

1. A device for emitting and receiving acoustic waves comprising:
   a wave emitter configured to transmit waves at a fixed emission frequency and
   a wave receiver separate from the wave emitter having a resonance frequency and configured to receive waves generated by the wave emitter and comprising direct waves and reflected waves,
   wherein the wave emitter and the wave receiver are a micromachined transducer and the device comprises
   a resonance frequency modulator of the wave receiver and
   a control unit configured to control the resonance frequency modulator during a predetermined time period so as to reduce the sensitivity of the wave receiver during said predetermined time period by moving the resonance frequency of the wave receiver away from the emission frequency of the wave emitter, and to control the resonance frequency modulator outside of the predetermined time period to tune the resonance frequency of the wave receiver to match the emission frequency of the wave emitter,
   wherein the predetermined time period starts at a same time that the wave emitter transmits the waves at the fixed emission frequency, the predetermined time period is at least equal to a time period for receiving the direct wave by the wave receiver, and the wave receiver is configured to receive the reflected waves after the predetermined time period ends.

2. The device according to claim 1, wherein the emission frequency of the wave emitter is the resonance frequency of the wave emitter.

3. The device according to claim 1, wherein the wave emitter and/or the wave receiver is a PMUT-type piezoelectric micromachined transducer.

4. The device according to claim 3, wherein the resonance frequency modulator of the wave receiver is configured to make the polarisation of the wave receiver vary during the predetermined time period so as move the resonance frequency of the wave receiver away from the emission frequency of the wave emitter.

5. The device according to claim 1, wherein the wave emitter and/or the wave receiver is a CMUT-type capacitive micromachined transducer.

6. The device according to claim 5, wherein the resonance frequency modulator of the wave receiver is configured to vary the electrostatic rigidity of the wave receiver during the predetermined time period.

7. The device according to claim 1, wherein the resonance frequency modulator of the wave receiver comprises a negative counterreaction charge amplifier configured to integrate the charge generated by the wave receiver to apply a predefined polarisation voltage to the wave receiver.

8. A method for detecting acoustic waves by the acoustic wave emission and reception device according to claim 1, comprising the steps below:
   emission of acoustic waves by the wave emitter at an emission frequency of the wave emitter,
   modulation of the resonance frequency of the wave receiver during a predetermined time period, to move it away from the emission frequency of the wave emitter, then
   detection of a wave reflected by the wave receiver.

9. The method according to claim 8, comprising, after the emission of waves, the reception of a direct wave by the wave receiver.

10. The method according to claim 9, wherein the modulation of the resonance frequency of the wave receiver starts during the reception of the direct wave by the wave receiver.

11. The method according to claim 9, wherein the modulation of the resonance frequency of the wave receiver is simultaneous to the reception of a direct wave by the wave receiver.

12. The method according to claim 8, wherein the modulation of the resonance frequency of the wave receiver is done by a variation of the polarisation of the wave receiver or a variation of the electrostatic rigidity of the wave receiver.

* * * * *